Sept. 25, 1956      H. R. BUNKER      2,763,954

FISH LURE

Filed Oct. 4, 1954

INVENTOR
*Hardin R. Bunker*

BY
*Cushman, Darby & Cushman*
ATTORNEYS

United States Patent Office 2,763,954
Patented Sept. 25, 1956

2,763,954

FISH LURE

Harden R. Bunker, Colonial Heights, Va.

Application October 4, 1954, Serial No. 460,188

2 Claims. (Cl. 43—42.31)

This invention relates to a fish lure which is adapted to invite the attention of fish to the presence of a suitable bait which is being moved through the water by the usual and well known casting techniques.

More particularly, this invention relates to a fish lure which is provided with an improved means for emitting sound waves which may attract fish within its audible range and will, therefore, materially increase the number of fish which will strike at, and, hence, will be caught by, a suitable bait which is used in association with the lure.

It has been previously proposed to provide a fish lure or fish bait with various devices whereby the bait, or lure, will vibrate and, therefore, transmit sonic impulses through the water. It is well known that some fish may be attracted by unusual sounds of low intensity, that is, which do not have a sufficient volume to displease or frighten them. It is within the contemplation of this invention to provide a fish lure which is provided with new and improved means for creating vibrations which emit sound waves audible, or at least sensible, to fish.

It is therefore an object of this invention to provide a new and improved fish lure which will emit sonic impulses which will attract fish to a bait carried in association with the lure.

It is a further object of this invention to provide a sonic fish lure having improved means for creating vibrations which will, in turn, create sonic waves, the sound producing means being operated by the relative movement of the lure and the water.

These and other objects of my invention will be fully understood from the following detailed description of a typical preferred form and application of the invention, throughout which description reference is made to the accompanying drawings in which.

Figure 1:
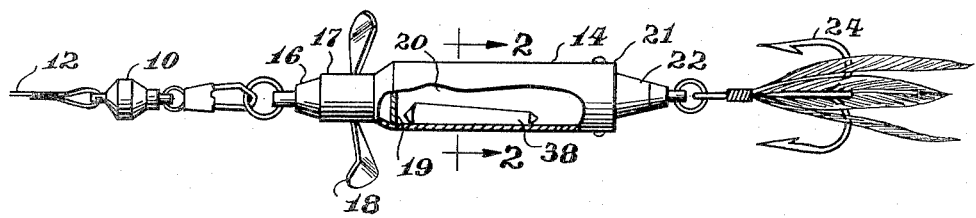
Figure 1 is a side elevational view of a fish lure, with portions broken away.

Referring to Figure 1, the fish lure is attached to a conventional fly swivel 10 which, in turn, has a casting line 12 secured thereto. The lure itself is made up of a hollow elongated cylindrical tube 14 which carries a ball bearing swivel 16 incorporated into the leading end 17 thereof. The swivel 16 may be welded, brazed or mechanically crimped in position. The leading end 17 also carries oppositely inclined vanes 18 fixed to the inner end of the swivel. The leading end 17 of the tube 14 is partitioned at 19 so that no water may enter its interior 20, through this end. The trailing end 21 of the lure is also provided with a ball bearing swivel 22, one end of which is fixed to the tube 14, and the other end of which carries a conventional bait 24, which may be of any desired shape, size or color. The configuration of the bait 24 is a matter of arbitrary selection and it is entirely without the contemplation of this invention.

Figure 3:
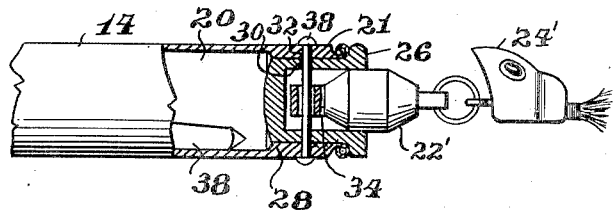
Figure 3 is an enlarged fragmentary view partially in longitudinal section illustrating a detail of the device shown in Fig. 1 slightly modified.

Referring to Figure 3, in which there is illustrated a preferred structure for closing the trailing end 21 of the tube 14, it will be seen that the open trailing end is provided with a rimmed cup 26 which makes a tight force-fit engagement with an interiorly disposed circumferential shoulder portion 28 formed in the tube 14. The cup 26 is provided with two diametrically opposed apertures 30 which may be brought in registry with apertures 32, which are diametrically opposed in the side wall of the tube 14 at the shoulder 28. The interior end 34 of the trailing ball bearing swivel 22 is disposed within the chamber defined by the cup 26, and the cup and swivel end are secured within the trailing end of the hollow tube 14 by a pin 38 which extends through apertures 30, 32. The cup 26 and the shoulder 28 may be so dimensioned that they will form a force-fit water tight seal which effectively prevents the entry of any water into the interior 20 of the hollow tube 14.

The bait 24', of conventional form is connected to the swivel 22' as shown.

Figure 2:
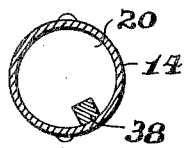
Figure 2 is a section taken along line 2—2 of Figure 1.

As illustrated in Figures 1, 2 and 3, an elongated polygonal weight 38 is freely disposed within the interior 20 of the tube 14. The weight 38 is here illustrated as having a square cross section but it is clearly within the contemplation of this invention that its cross section may be any suitable polygon. As the interior wall of the tube 14 is curved, it will be seen that rotation of the lure about its longitudinal axis will cause the weight to tumble transversely of the lure, always seeking to maintain itself in a position near the lowest point on the interior wall. As the weight has a polygonal cross section, and is so dimensioned as to be able to turn or rotate within the interior of the hollow body 14, it will be seen that every time it tumbles against the thin metallic wall, a clear, sharp and distinct sound will be created by the impact, unless, of course, the tube 14 is rotating too fast, and the rotational speed may be controlled by controlling the speed with which the lure is moved relative to the water or, also, by adjusting the pitch of the vanes 18.

In operation, the lure and bait may be slung a considerable distance into the water by the use of the usual casting techniques. When the lure and bait are slowly drawn in, in the usual manner, the propeller 18 of the leading end of the lure will cause the cylindrical tube 14 to rotate about its longitudinal axis as it moves through the water. This twisting motion will be independent of the line 12 and bait 24 due to the swivels 10, 16 and 22. As the weight 38 is polygonal, that is, has a plurality of well defined flat longitudinally extending sides, it will not roll or slide in the rotating tube 14 but rather will tumble in a transverse direction due to the relation of the diameter of the weight and the internal diameter of the tube. As each side of the weight 38 falls against the inner surface of the tube 14, a report or vibration is set up in the tube, thus creating sonic waves which will be transmitted through the water and which will attract the attention of any fish which happen to be in the vicinity. Apparently, the fish are attracted by the sound waves and will move to a position closely adjacent the lure and at this point the bait itself comes to their attention. If the bait is properly selected, the fish will strike at the bait and the fish may then be played and drawn in in the usual manner.

It will be readily seen that varying the mass, size, or material of the polygonal weights will slightly alter the characteristics of the sounds emitted by a particular lure. It will also be seen that any change in the size or material of the cylindrical body 14 of the lure will also serve to alter the characteristics of the sound waves. It has been found that the hollow tube may be formed from expended .30 caliber cartridge shells, which are usually formed of brass, but it is entirely within the contemplation of this invention that other cylindrical forms may be used and that it may be constructed of other materials.

Figure 4:
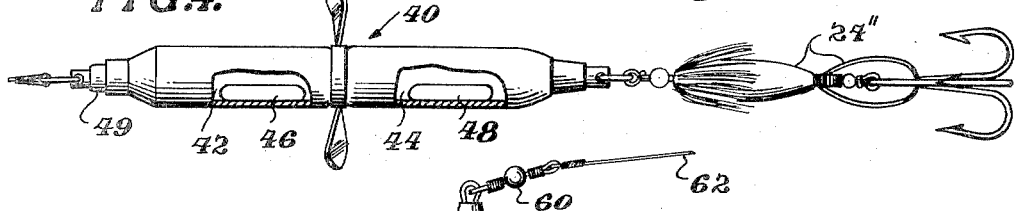
Figure 4 is a side elevational view of a modification of the invention, with portions broken away.

Referring more particularly to Figure 4, there is illustrated a modification of this invention in which the lure 40 is formed with two co-axial cylindrical chambers 42 and 44 having polygonal weights 46 and 48, respectively, disposed therein. The body of the lure is provided with two exteriorly disposed vanes 46 and with ball bearing swivels 49 at the respective ends thereof. A conventional bait 24″ is connected to the rear swivel as shown. The polygonal weights may be formed of slightly different sizes and shapes so that the weights will not necessarily tumble transversely in unison, but rather will tumble at slightly spaced intervals as the lure 40 rotates in the manner discussed hereinabove. Thus the lure will create plural or dual ringing sounds intermixed which apparently approximate sounds which may be attractive to fish. It is also within the contemplation of this invention that the weights 46, 48 may be formed of different materials so that each will create a slightly different sound or tone.

Figure 5:
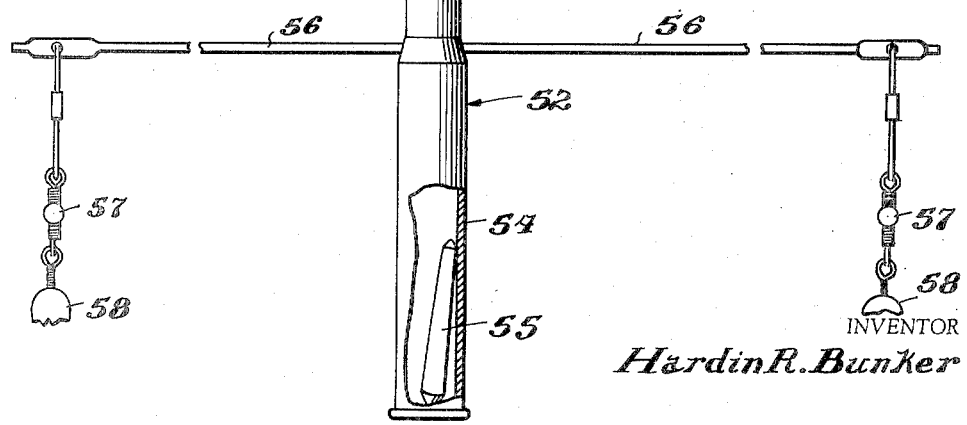
Figure 5 is a top plan view of an additional modification of the invention, with portions broken away.

In Figure 5, there is illustrated another modification of this invention which is particularly adapted for use in trolling or bottom fishing. A lure 52 is formed of a hollow elongated cylindrical tube 54 and has an elongated polygonal weight 55 freely disposed therein in the manner discussed hereinabove. The lure has two oppositely disposed radially extending arms 56 which carry conventional swivels 57 secured thereto adjacent the free ends thereof. Conventional baits 58 may be secured to these swivels in the usual manner. The leading edge of the lure 52 is provided with a ball bearing swivel 60 which has a trolling line 62 tied thereto. When this trolling lure is towed through the water, the currents acting on the respective baits will cause the lure to undergo sufficient angular motion to cause the polygonal weight 55 to tumble transversely back and forth in the manner discussed hereinabove so that the lure will emit sonic waves which will attract fish to the immediate vicinity of the baits.

Having described only typical preferred forms and applications of my invention, I do not wish to be limited or restricted to specific details herein set forth but wish to reserve to myself any variations or modifications that may appear to those skilled in the art and falling within the scope of the following claims.

I claim:

1. A fish lure comprising an elongated tubular body; vane means mounted on said body adapted to induce rotation of said body about its longitudinal axis when said body is moved longitudinally through water; an elongated polygonal weight extending longitudinally within said body, the diameter of said weight and the internal diameter of said body being so related that said weight will readily rotate on an axis parallel to the longitudinal axis of said body and tumble against the inner surface of said body when the body is moved longitudinally through water, thereby producing a noise with each tumble, whereby said lure will emit a continuing series of sharp and distinct sonic waves as it moves longitudinally through water.

2. The fish lure disclosed in claim 1 wherein said polygonal weight is rectangular in cross section.

References Cited in the file of this patent

UNITED STATES PATENTS

| Number | Name | Date |
|---|---|---|
| 538,169 | Kelley | Apr. 23, 1895 |
| 841,429 | Passage | Jan. 15, 1907 |
| 1,608,375 | Dewey | Nov. 23, 1926 |
| 1,870,559 | Drake | Aug. 9, 1932 |
| 2,197,096 | Cyr | Apr. 16, 1940 |
| 2,251,593 | Mangle | Aug. 5, 1941 |
| 2,270,487 | Withey | Jan. 20, 1942 |
| 2,399,333 | Desmond | Apr. 30, 1946 |
| 2,613,471 | Traycik | Oct. 14, 1952 |